Jan. 12, 1926.  1,569,652
H. N. HALVERSEN.
GLASS BODY FORMING MACHINE
Filed Feb. 2, 1922   9 Sheets-Sheet 3
Fig. 6.
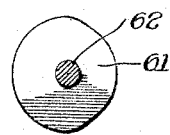
Fig. 5.
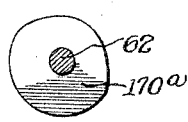
Fig. 4.
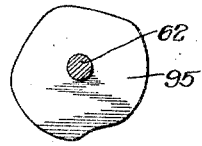
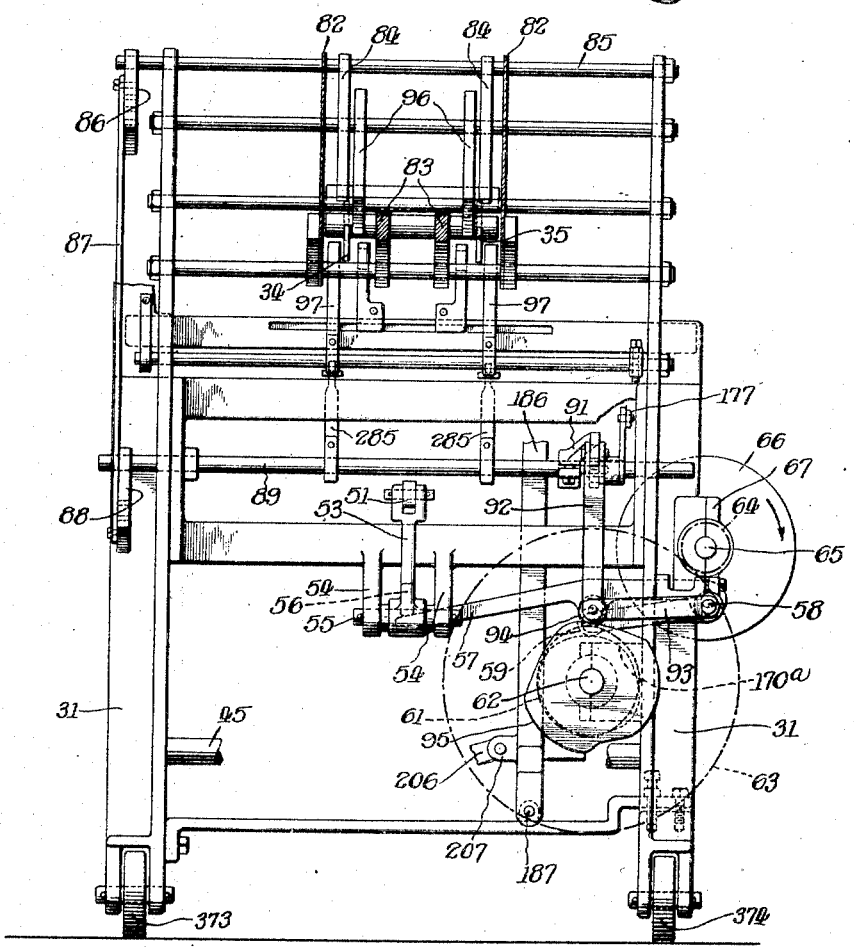
Fig. 3.
INVENTOR
Hans N. Halversen
BY Walter M. Fuller
ATTORNEY Jan. 12, 1926. 1,569,652
H. N. HALVERSEN
GLASS BODY FORMING MACHINE
Filed Feb. 2, 1922   9 Sheets-Sheet 4
Fig. 9.
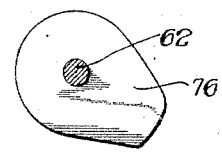
Fig. 8.
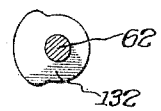
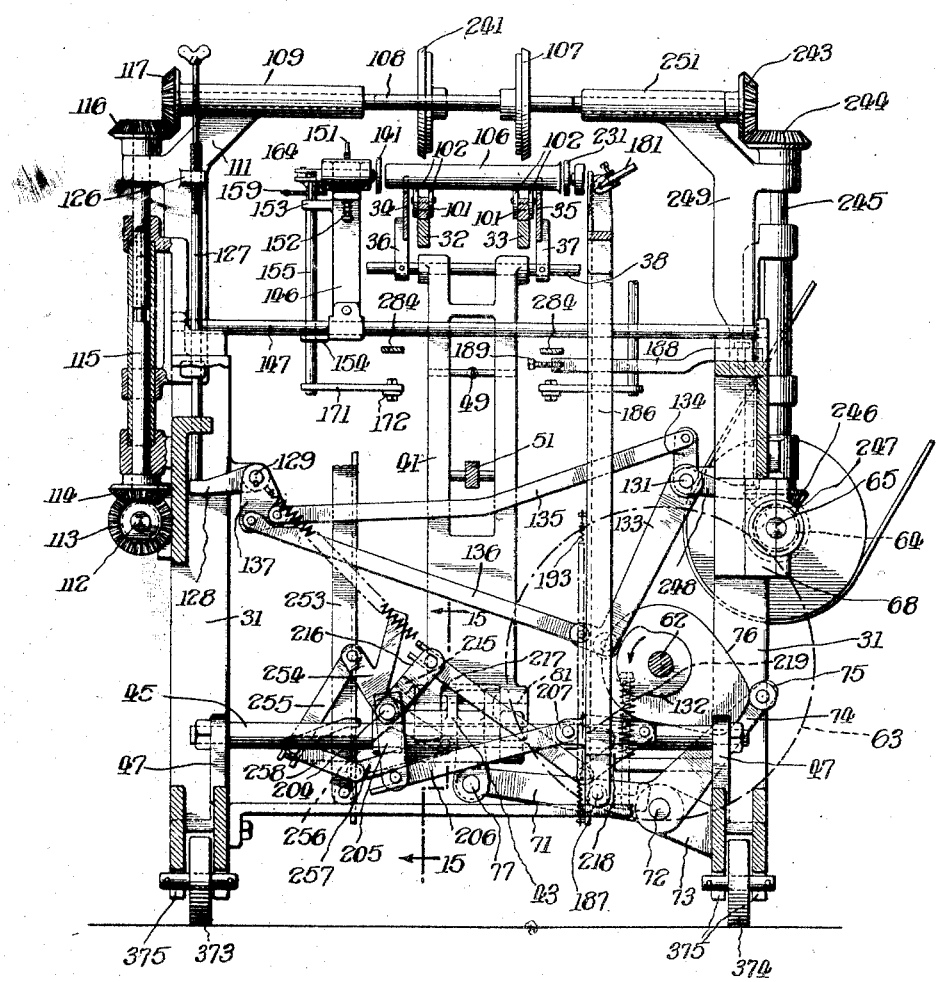
Fig. 7.
INVENTOR
Hans N. Halversen
BY Walter M. Fuller
ATTORNEY Jan. 12, 1926.  
H. N. HALVERSEN  
1,569,652  
GLASS BODY FORMING MACHINE  
Filed Feb. 2, 1922.  
9 Sheets-Sheet 5
Fig. 14. 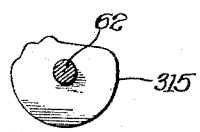 Fig. 13. 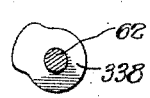 Fig. 12. 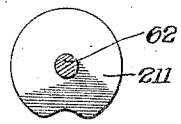 Fig. 11. 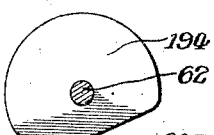
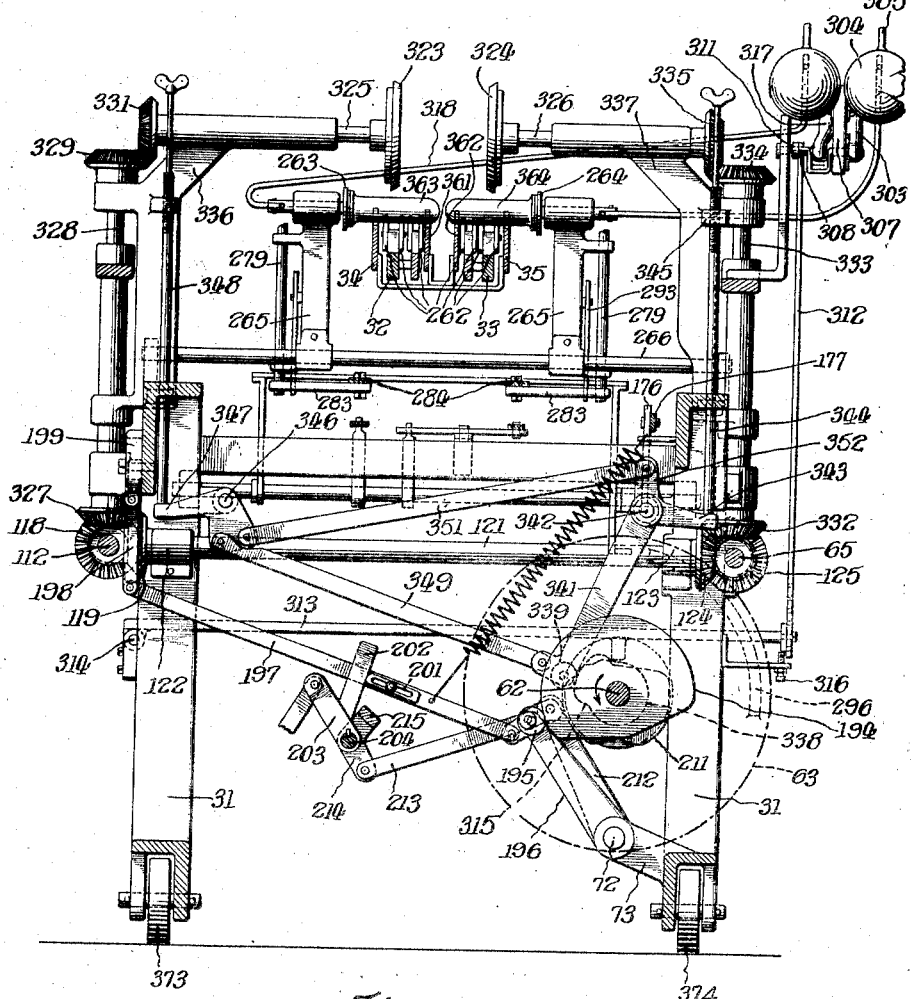
Fig. 10.
INVENTOR  
Hans N. Halversen  
BY Walter M. Fuller  
ATTORNEY Jan. 12, 1926. 1,569,652
H. N. HALVERSEN
GLASS BODY FORMING MACHINE
Filed Feb. 2, 1922 9 Sheets-Sheet 6

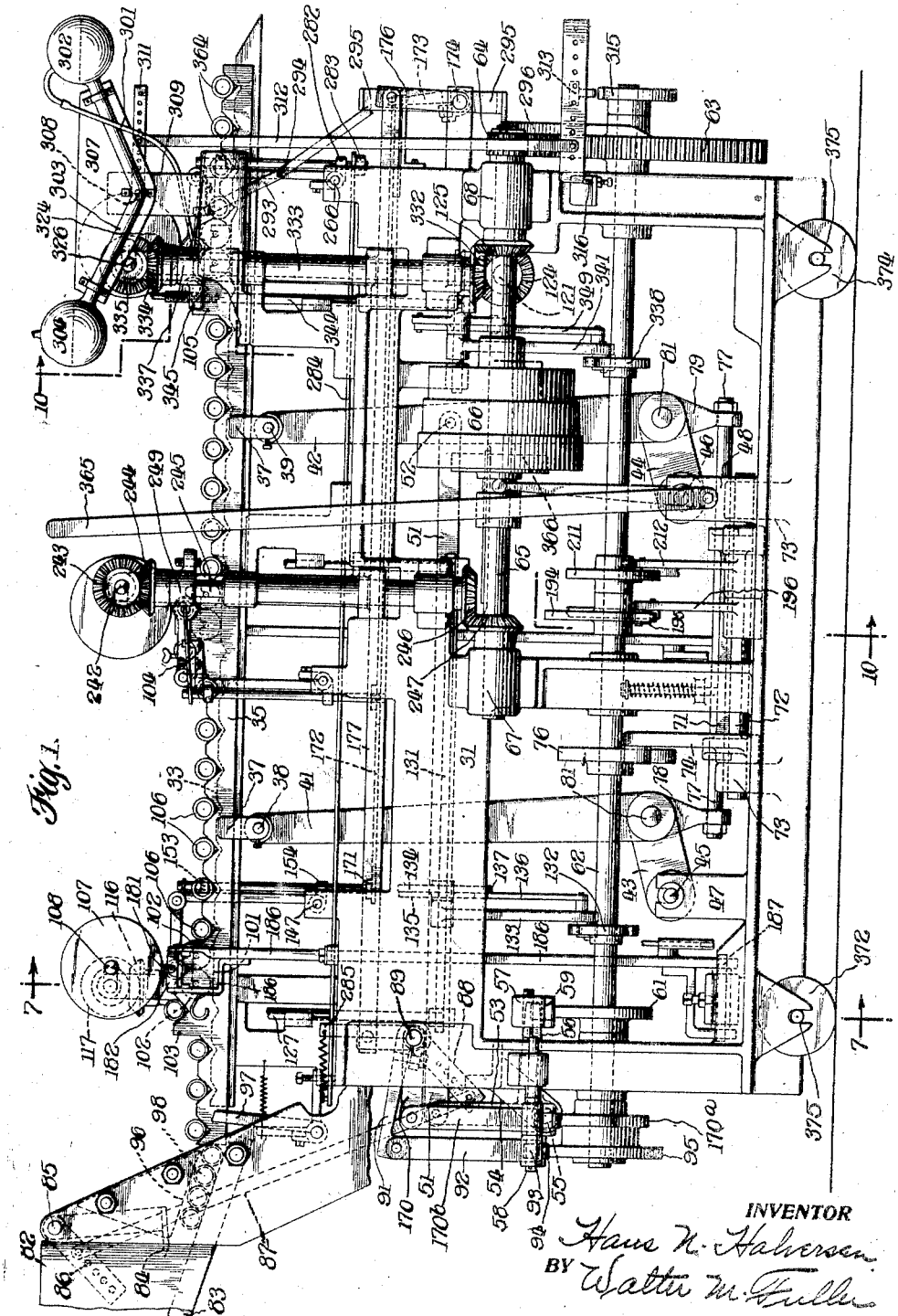

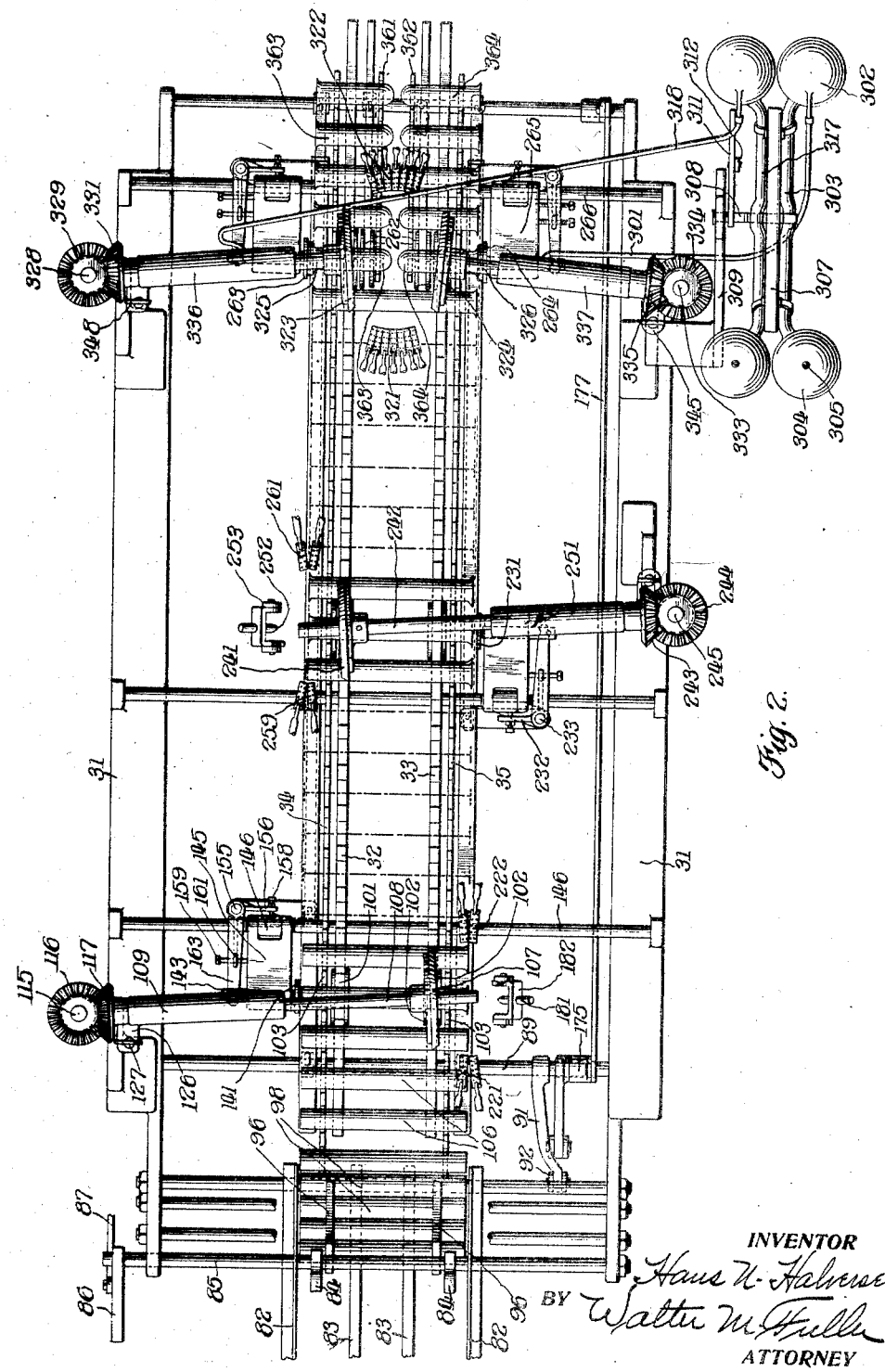

INVENTOR
Hans N. Halversen
BY Walter M. Fuller
ATTORNEY

Jan. 12, 1926.
H. N. HALVERSEN
GLASS BODY FORMING MACHINE
Filed Feb. 2, 1922  9 Sheets-Sheet 7
1,569,652
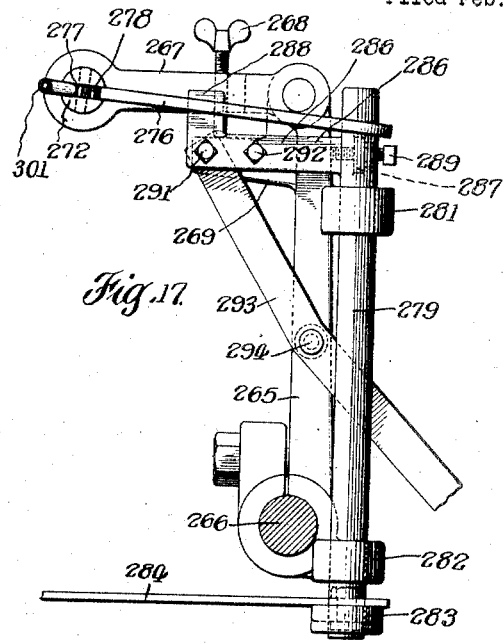
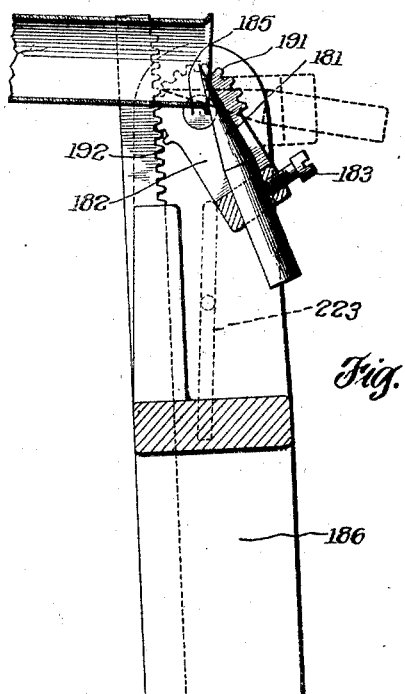
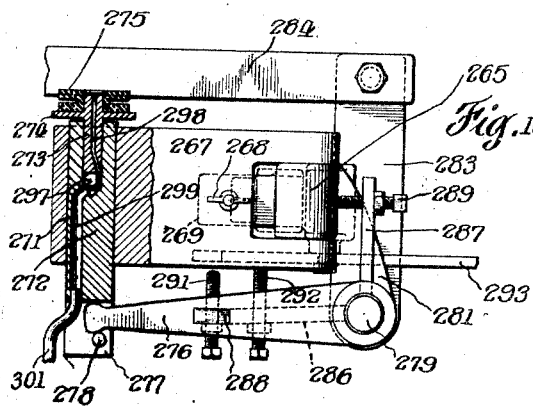
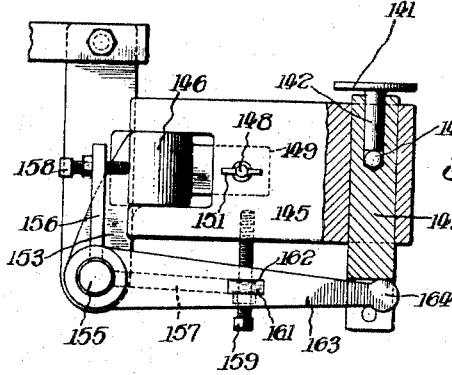
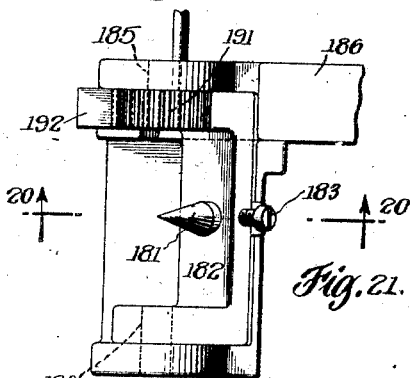
INVENTOR
Hans N. Halversen
BY Walter M. Fuller
ATTORNEY

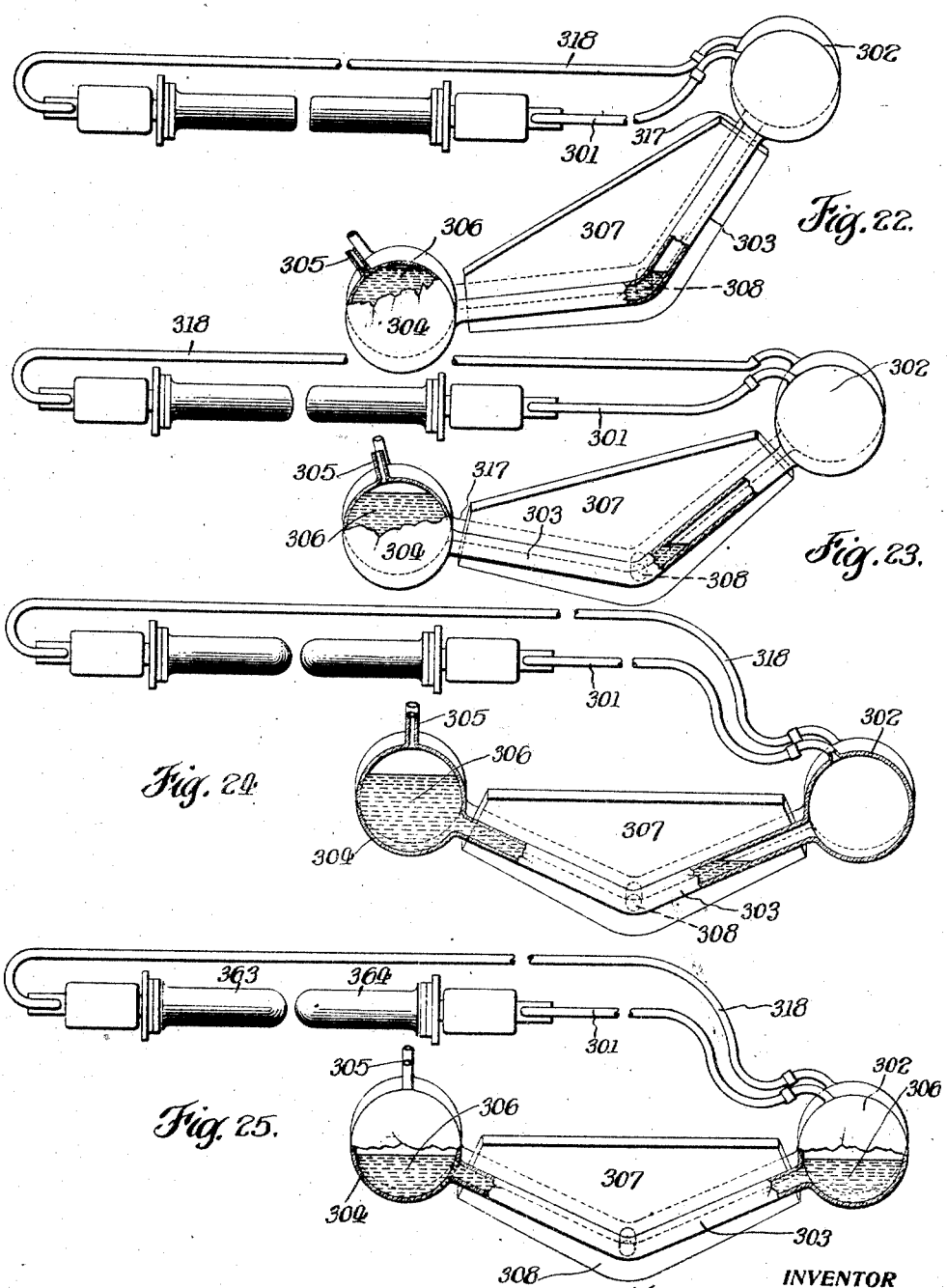

Jan. 12, 1926. 1,569,652
H. N. HALVERSEN
GLASS BODY FORMING MACHINE
Filed Feb. 2, 1922 9 Sheets-Sheet 9

INVENTOR
Hans N. Halversen
BY Walter M. Fuller
ATTORNEY

Patented Jan. 12, 1926.

1,569,652

UNITED STATES PATENT OFFICE.

HANS N. HALVERSEN, OF VINELAND, NEW JERSEY, ASSIGNOR TO KIMBLE GLASS COMPANY, OF CHICAGO, ILLINOIS, A CORPORATION OF ILLINOIS.

GLASS-BODY-FORMING MACHINE.

Application filed February 2, 1922. Serial No. 533,574.

*To all whom it may concern:*

Be it known that I, HANS N. HALVERSEN, a citizen of the United States, residing at Vineland, in the county of Cumberland and State of New Jersey, have invented certain new and useful Improvements in Glass-Body-Forming Machines, of which the following is a specification.

My invention concerns an improved and novel type and style of mechanism for producing automatically rounded bottom glass or similar bodies such as test tubes, ampuls, bottles, and the like.

It also provides means for automatically forming the outwardly-flaring smooth-edge lips at the opposite ends of such bodies, test tubes for example.

The general or main object of the invention is the provision of a machine which will perform this work efficiently and effectively, which is relatively simple in structure, which is unlikely to become injured or damaged in ordinary service, which is comparatively economical to manufacture, and which results in a relatively small percentage of breakage of the glass bodies on which it acts.

To enable those skilled in this art to have a full and complete understanding of the invention and its various advantages, I have illustrated a desirable and preferred embodiment of the invention in the accompanying drawings forming a part of this specification, and to which reference should be had in connection with the following detailed description of the structure and its mode of operation, like reference characters referring to the same parts throughout the several views of the drawings.

In these drawings:

Figure 1 is a side elevation of the entire machine,

Figure 2 is a plan view of the same,

Figure 3 is an end view of the mechanism, and illustrates the left hand end of the machine as shown in Figure 1, Figures 4, 5 and 6 are separate views of the three cams shown in Figure 3;

Figure 7 is a vertical cross-section of the mechanism on line 7—7 of Figure 1, the parts being viewed in the direction indicated by the arrows Figure 8 and 9 show the two cam illustrated in Figure 7;

Figure 15:
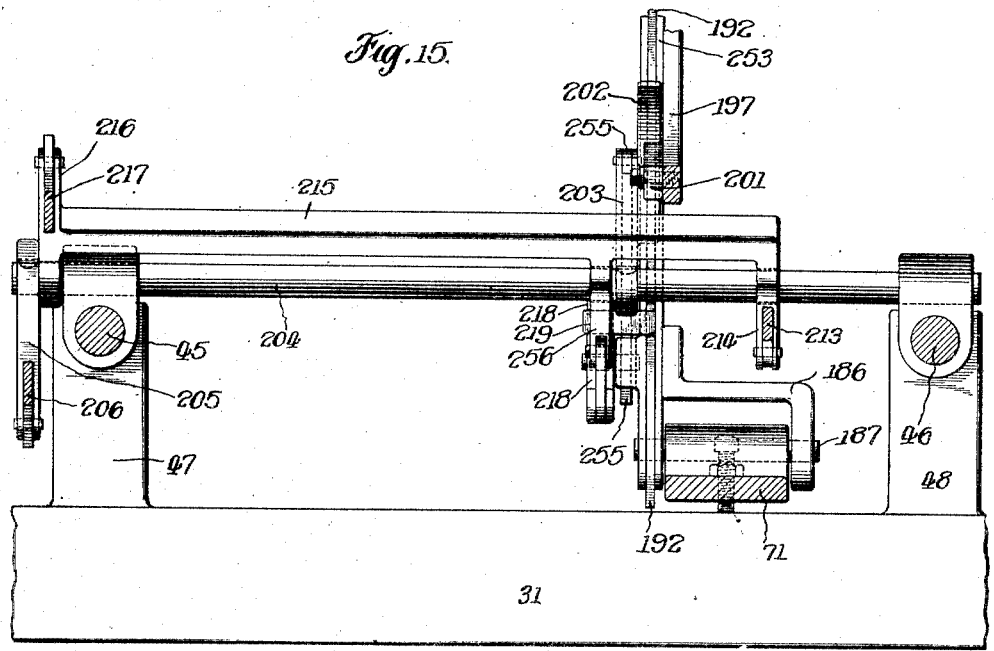
Figure 16:
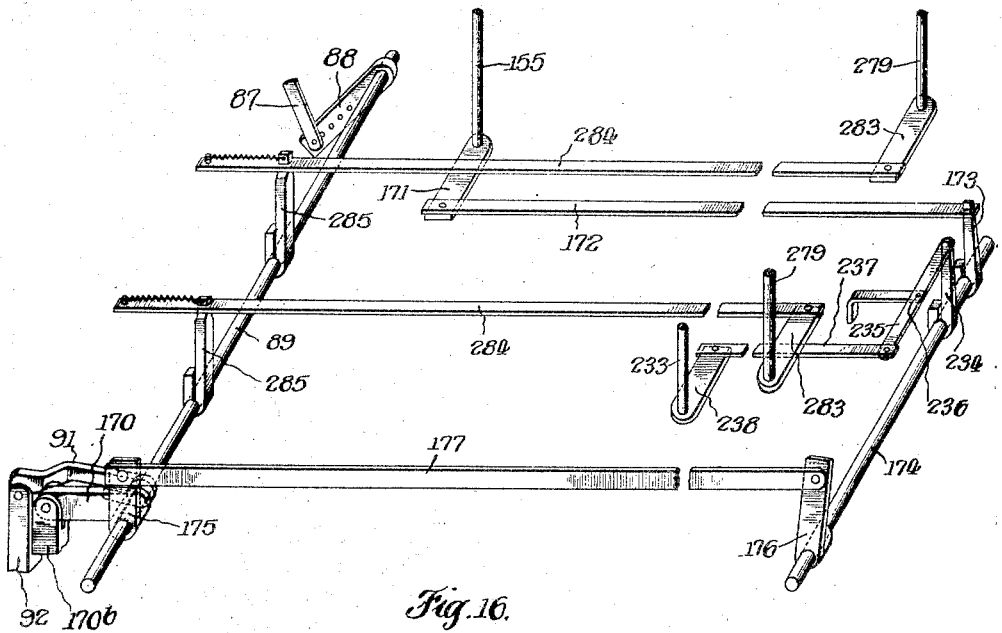
Figure 26:
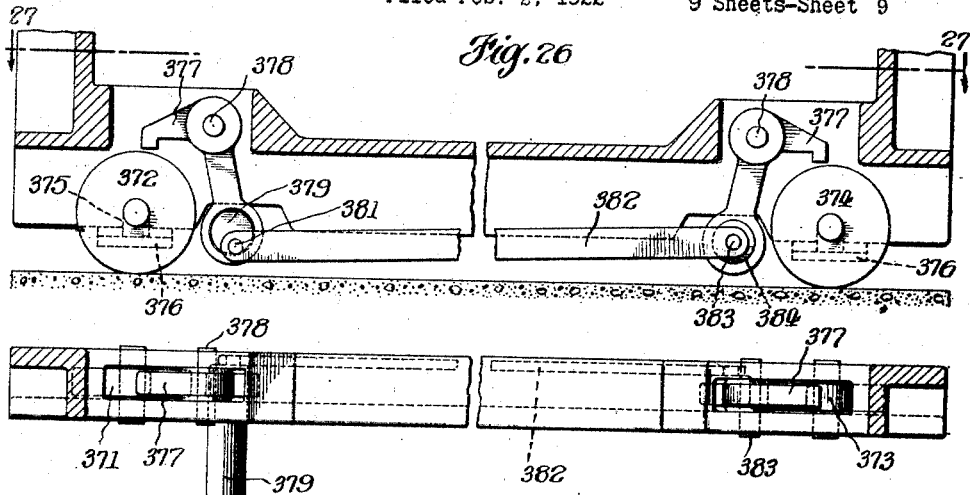
Figure 27:
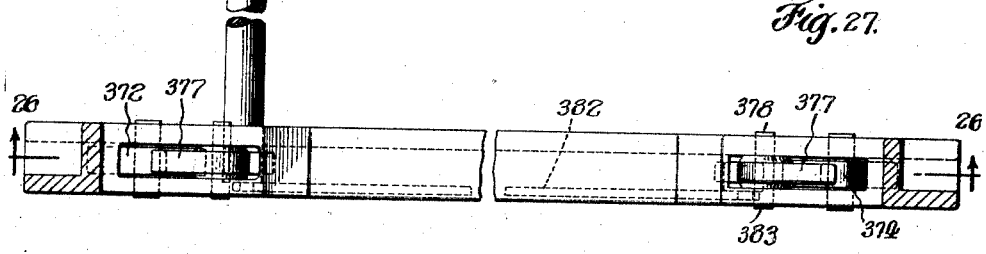
Figure 28:
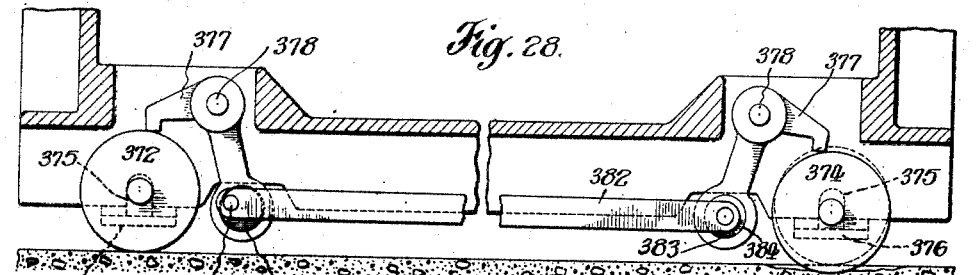
Figure 29:
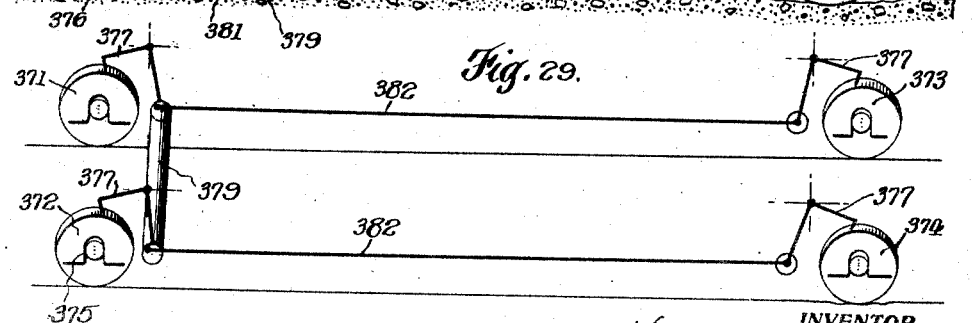

Figure 10 presents an irregular vertical cross-section on line 10—10 of Figure 1, the parts being viewed in the direction indicated by the arrows;

Figures 11, 12, 13 and 14 show the cams illustrated in Figure 10;

Figure 15 is an enlarged section on line 15—15 of Figure 7, the parts being represented as indicated by the arrows, Figure 16 presents a diagrammatic perspective view showing the levers which operate the tail-stocks, Figure 17 shows the mechanism for operating one of the bottoming tail-stocks, Figure 18 is a partial plan and partial section of the mechanism shown in Figure 17;

Figure 19 is a similar view of one of the lipping tail-stocks;

Figure 20 is a vertical section on line 20—20 of Figure 21 and depicts the lipping appliance;

Figure 21 is a plan view of the mechanism shown in Figure 20;

Figures 22, 23, 24 and 25 show diagrammatically the pressure producing device in its various positions;

Figure 26 is a section on line 26—26 of Figure 27 and illustrates the stabilizing device;

Figure 27 is a partial plan and partial section showing such stabilizing appliance;

Figure 28 is a vertical section of the stabilizing device indicating one wheel resting in a depression; and Figure 29 is a diagrammatic view of the stabilizing structure.

The machine consists of two parts or sections, the one designed to provide the lips on the bodies, and the other to form the rounded or bulged bottoms, it being understood that the glass blanks are of double length and divided by the machine into two of the hollow bodies to be produced.

By reference to these drawings, it will be observed that the machine comprises a main frame 31 of suitable shape and on this are mounted a pair of parallel, stationary, horizontal, transversely-adjustable, blank-supporting bars 32, 33 notched or recessed at intervals along their top edges.

The glass blanks or tubes are fed along such supporting bars from notch to notch by a suitable conveyor or carrier comprising a pair of parallel, horizontal, notched bars 34, 35 disposed just outside of the companion, stationary bars 32 and 33.

Such feeder or blank-transporting bars are mounted with adjustment toward and from one another by means of aperture depending ears 36 and 37 and associated set-screws on a pair of cross-rods 38 and 39 supported respectively on the upper ends of two links 41 and 42 pivoted at their lower ends on arms 43 and 44 rockable on stationary cross-shafts 45 and 46 supported on brackets 47 and 48 on the bottom bars of the main-frame.

These upright links are desirably of skeleton-frame construction, the left-hand one 41, as the parts are viewed in Figure 1, being yieldingly pulled to the right by a coil contractile spring 49 connected thereto and to a cross-bar of the main-frame of the machine, the spring extending through the companion link.

In similar manner link 42 is pulled in the same direction by another spring, not shown to avoid confusion in the illustration, but no difficulty will be encountered in understanding this portion of the structure and its function.

Such links and the blank-conveyor bars which they carry are rocked to the left, as seen in Figure 1, in proper timed relation to the movements of the other parts of the mechanism and in opposition to the pulling action of their springs by means of a horizontal link 51 pivoted to the right-hand, upright link 42 at 52, extended through the other, companion, upstanding link 41, and pivotally connected at its other end to the top portion of one arm 53 of a bell-crank lever oscillatory on a stationary pin or shaft 55 mounted in obliquely-depending bracket-arms 54 on an adjacent cross-bar of the main-frame.

The other or approximately-horizontal arm 56 (Fig. 1) of the bell-crank lever is designed to be lifted to rock the lever by means of an arm 57 extended forwardly beneath it and fulcrumed at 58 in a rearwardly-extended bearing on the back of one of the rear, upright posts of the main-frame, such arm being rocked through an antifriction roller 59 on its under face traveling on the edge of a cam 61 (Figure 1) on a long, horizontal shaft 62 mounted to rotate in suitable bearings on the frame and disposed lengthwise the latter, such shaft being driven through appropriate gearing 63, 64 by an upper, shorter drive-shaft 65 equipped with a belt-driven cone-pulley 66 and supported in bearings 67 and 68 on the frame.

By the operating means described, the links 41 and 42 and their notched or recessed glass-blank transporting bars are moved back and forth, but it is also necessary to give them an up and down travel to effect their proper rise and descent to lift the blanks from their supports and to deposit them in the next set of recesses of the stationary bars.

To the accomplishment of this object, a frame 71 (Figures 1 and 7) is rockingly mounted on a short, stationary shaft 72 supported in bearings 73, 73 at the middle of the lower back part of the main-frame, such rocker-frame being oscillated by means of an upwardly-projecting arm 74 supplied with a roller 75 cooperating with the edge of a cam 76 on shaft 62.

The oscillatory frame carries a longer rod 77 rockingly connected by links 78 and 79 with pins 81, 81 securing together the arms 43, 44 and the upright links 41 and 42.

Thus cam 76 brings about the proper upward and downward movements of such links to lift the glass tubular blanks out of their recesses in the stationary supporting bars and to deposit them in a downward direction in the next recesses.

The storage-magazine for supplying the glass tubular blanks one by one or singly to the machine is composed of a pair of spaced side plates 82, 82 (Figures 1 and 2) and a pair of inclined, parallel, bottom bars 83, 83 on which the blanks are adapted to rest, the magazine being equipped with appropriate depending agitators 84, 84 mounted on a cross-shaft 85 designed to be rocked by an arm 86 secured thereto and connected by a link 87 to a similar arm 88 on a suitably-supported cross-shaft 89 equipped with another arm 91 connected by a link 92 to still another arm 93 (Figure 3) fulcrumed at 58 and supplied with a roller 94 cooperating with the edge of a cam 95 on shaft 62.

Hence this cam effects the oscillation of the agitators assuring the proper feeding of the blanks at all times.

These blanks in the magazine, of which only a few are shown, are caused to roll down the supports 83, 83 in a single row 98 by reason of the guards 96, 96 and the lowermost blank is prevented from falling out of the discharge mouth of the magazine by a pair of spring-pressed, screw-adjustable, upstanding, stop fingers 97 (Figure 1) of any appropriate form.

The conveyor 34, 35 lifts the lowermost blank of the magazine from its seat and removes it therefrom, whereupon the next blank rolls down to take its place, the other blanks also descending automatically to occupy new positions as permitted by the removal or withdrawal of the blank referred to.

Not far from the blank supply compartment, the two, stationary bars 32 and 33 are each provided on its top with a block 101 carrying four anti-friction idle rollers 102, the eight rollers being adapted to unitedly support one of the duplex glass tubular blanks while one of its ends is being glazed and a flaring annular lip formed thereon.

In order that the notched conveyor or transporter bars 34, 35 may lift the glass blanks sufficiently to deposit them on such set of supporting rollers, each of such bars has a notched or recessed section 103 somewhat above the general top edge of the bar, and with similar raised portions 104 and 105 employed in association with other groups of rollers referred to hereinafter.

To rotate or revolve the tubular glass blank 106 resting on the rollers 102, 102, I provide above it a bevelled soft-rubber disc 107 suitably mounted on a transverse shaft 108 arranged slightly canted or oblique to the axis of the blank, whereby to draw such tube lengthwise against an abutment.

Shaft 108 is revoluble in a bearing 109 on a bracket-member 111 vertically slidable in the main-frame, such shaft being rotated from a front horizontal shaft 112 through intermeshing bevel-gears 113, 114, a telescopically extensible and contractible vertical shaft 115, and cooperating bevel-gears 116, 117, shaft 115 being rotatable in bearings some of which are on the main-frame and with at least one on the bracket element 111.

As is depicted in Figure 10, shaft 112 is rotated from the pulley-equipped drive-shaft 65 at the rear of the machine through an intermediate cross-shaft 121, rotatable in bearings 122, 123 on the main-frame and correlated, intermeshing, bevel gears, 118, 119, 124 and 125.

To cause the vertical reciprocation of the element 111, carrying the tube-rotating, bevelled, rubber-disc roller 107, it is supplied with a threaded boss 126 adjustably receiving a screw-threaded plunger-rod 127 slidable in and guided by one or more holes or bearings in the main-frame, the lower end of such plunger resting on an arm 128 fixed to a long, horizontal shaft 129 in suitable bearings on the main-frame, such shaft being oscillated by a cam 132 on shaft 62 through a guide lever 133 loosely hung on a shaft 131 at the rear portion of the machine, and link 136 connecting said lever to a lever 137 also fixed to shaft 129.

Shaft 131 in turn is rocked by reason of a link 135 connecting lever 137 with an arm 134 fixed on such shaft.

The tail-stock and its operating mechanism for the glass tube resting on the rollers 102, 102 comprises the following specified co-acting parts.

The tail-stock disc 141 (Figure 19) has a stem 142 revoluble in a bearing in a slidable shaft 143, the inner end of such stem bearing against an antifriction ball 144 in the socket.

Shaft 143 is slidable crosswise in a horizontal arm 145 hinged at the upper end of a vertical bar 146 clamped adjustably at its lower end on a cross-rod 147 mounted on the main-frame.

The hinge mounting is provided merely to permit adjustment of the two parts relatively to one another and this is accomplished by means of a thumb-screw 148 engaging at its lower end a projection 149 on the vertical bar and equipped with a lock thumb-nut 151, a spring 152 normally pulling the block 145 down.

In order to slide such tail-stock disc slightly, the element 146 is equipped with lugs 153, 154 affording bearings for an upright shaft 155 having right-angle arms 156, 157 fixed on its upper end, and supplied with adjustable stop screws 158 and 159 to determine the angular position of the shaft.

Arm 157 has an upright projection 161 in a slot 162 of a horizontal arm 163 loosely mounted on shaft 155 and having a rounded end 164 in a slot in the end of shaft 143, whereby oscillation of shaft 155 causes a slight reciprocation of shaft 143 and the tail-stock disc which it carries.

At its lower end shaft 155 has an arm 171 fixed thereto pivotally connected to a long horizontal link 172 connected at its other end to an upstanding arm 173 rigid with a transverse shaft 174 at one end of the machine and mounted in suitable bearings on the main-frame.

Shaft 174 receives its oscillatory movement through two arms 175 and 176, the former free to rock on shaft 89 and the latter fastened to shaft 174, these arms being operatively associated together, through a connecting link 177, the hub of arm 175 having an arm 170 rigid therewith and actuated by a cam 170ᵃ on shaft 62 through a link 170ᵇ.

A tapered or conical lipping or rim forming tool 181 for the end of the tubular blank opposite the tail-stock is longitudinally adjustably mounted in a yoke 182 being held in the desired position by a clamping or set-screw 183, the yoke being rockingly mounted at 184, 185 in the upper bifurcated end of an upright arm 186 swingingly mounted at 187 on a cross-bar of the main-frame.

This arm is guided in its rocking movements by a horizontal, slotted member 188 carried by the main-frame and equipped with an adjustable stop or abutment screw 189 adapted to limit the movement of the arm in one direction, such arm extending upwardly through the guiding aperture of the member (see Figure 7).

One side of yoke 182 (Fig. 20) is formed as a gear-sector 191, the teeth of which are in mesh with those of a rack 192 slidingly mounted on the rock-arm 186, extended downwardly beyond the lower end of its carrying arm, and pulled upwardly by a coil contractile spring 193 (Fig. 7) having its opposite ends connected to the arm and rack respectively.

Arm 186 and the lipping-tool are pulled toward the end of the glass tubular blank by a spring (not shown) acting on the arm and the latter is permitted to respond to the action of the spring and to be retracted from the blank by the following specified parts.

A cam 194 (Fig. 10) on shaft 62 co-acts with a roller 195 at the elbow of a bent arm 196 fulcrumed at 72 on the main-frame near the middle of the length of the latter, a link 197 connecting the free end of the arm with a suspension-link 198 vertically adjustably mounted on the frame at 199.

Link 197 (Fig. 10) carries an adjustable lug 201 abutting against an extension 202 of an arm 203 keyed to a shaft 204 having another arm 205 (Fig. 7) with a pin and slot connection with a link 206 pivotally attached to a lug 207 projecting from the upright rock-arm 186.

Thus cam 194 brings about the desired or necessary oscillation of rock-arm 186 and the lipper which it carries.

A cam 211 (Fig. 10) on shaft 62 cooperates with a roller on a bent arm 212 also rockingly mounted at 72, a link 213 connecting the arm to a projection 214 on a relatively-long bracket or bar 215 rockingly mounted on shaft 204, the element 215 having another projection 216 (Fig. 7) with a pin and slot connection with a link 217 pivoted at its other end to a bell-crank lever 218 which engages a lug 219 on the rack-bar 192 and is adapted to control the sliding response of the latter to the action of its spring and to govern the downward movement of the rack.

As is clearly shown in Figure 2, two sets of gas-burners 221 and 222 with automatic means for controlling the supplies of gas and air thereto, as is customary in glass working machine, are provided adjacent to that end of the glass blank next to the lipping tool just described.

It will be readily understood, therefore, that when the tubular glass blank is deposited by the conveyor or transporter in the stationary saddles or seats in register with the tail-stock and the lipping-tool, the tail-stock advances slightly, the upper, bevelled, rubber, disc roller descends into contact with and rotates the blank at the same time pulling it over lengthwise against the revoluble tail-stock, the gas-flames are automatically caused to play on the opposite end of the tube, and, when this has been sufficiently heated, the tapered lipping-tool, while in substantially horizontal position, enters the heated end of the tube, due to the rocking of the arm 186 by the mechanism already described, and then swings or turns downwardly by reason of the upward sliding of its rack, thereby forming a smooth flaring lip entirely around the end of the blank, the gas flames being greatly reduced just prior to the lipping operation whereby to terminate their heating action on the glass.

Then the lipping-tool swings upwardly and is withdrawn from the tube having completed its work, the rubber roller rises, and the tail-stock recedes slightly, whereupon the lipped blank is carried away by the conveyor and a rough blank substituted in its place, the latter then being lipped in like manner.

While arm 186 is swinging toward the tubular blank to carry the lipping-tool into it, the connections of the latter are concentric with those of the arm, whereby to prevent any turning movement of the tool during its insertion.

The downward rocking or swing of the tool during the performance of its lipping function is occasioned by the action of the coil contractile spring on the slidable rack, so that, if by accident the supply of gas should be shut off and the end of the tube not heated, the tool will give or yield sufficiently to avoid breaking of the glass.

The rocking movement of the lipping or edge-finishing tool is limited by a suitable stop 223, preferably adjustable, shown diagrammatically in Figure 20, and if desired the parts may be so arranged that the tapered lipping tool will slightly preliminarily bevel the edge of the blank as it enters the open end thereof, the flaring operation being completed during the subsequent rocking of the tool.

Near the middle of the length of the machine there is a second lipping or end-finishing station whereat the other end of the duplex tubular glass blank is supplied with a like flaring lip, or finishing rim.

At this point the machine is provided with a revoluble disc abutment 231 (Figures 2 and 7) operated by mechanism 232, substantially like that previously described, whose upright shaft 233 (Figures 2 and 16) is rocked by shaft 174 through an arm 234 connected to the shaft and operatively associated with one end of a lever 235 (Figure 16) fulcrumed at 236 and connected through a link 237 with an arm 238 mounted on and rigid with the lower end of shaft 233.

The glass blank supported on the antifriction rollers in this position is rotated as in the previous instance by a rubber, bevelled, disc roller 241 on a shaft 242 revolved by an upright shaft 245 through intermeshing bevel-gears 243 and 244, such vertical shaft in turn being rotated by shaft 65 through co-acting bevel-gears 246 and 247, the construction being substantially the same as that illustrated in Figure 7 which is employed with the first, bevelled-rubber roller described above.

An arm 248 (Figure 7) on shaft 131 acts to control the raising and lowering of the bracket 249 carrying the bearing 251 in which shaft 242 is mounted, whereby the blank-rotating rubber disc may be raised and lowered as occasion requires.

A second, oscillatory, lipping tool 252 (Fig. 2) is employed for providing the rim on the blank when in this position, the tool being mounted in a manner substantially like that of the one already described.

Its upright rock-arm 253 (Fig. 7) is oscillated back and forth by means of an arm 254 on shaft 204 connected to the element 253 by a link 255 and the rack for rocking the tool is actuated through an extension 256 on bar 215, a link 257, and a bell-crank lever 258.

Groups of gas-burners 259 and 261 (Fig. 2) are properly located to heat the end of the glass blank adjacent to such lipping appliance and of course these burners are equipped with suitable control devices to regulate the play of their flames on the glass blank.

The double-lipped duplex-blank, during its intermittent or step-by-step travel, reaches and is deposited upon the anti-friction rollers 262 associated with the elevated portions 105 of the blank supporting bars.

It is at this station that the blank is to be divided into two parts or sections, and each supplied with a rounded or bulged bottom.

At this station, two, opposed tail-stocks 263 and 264 are employed, and, inasmuch as these are substantially alike, as to their details of structure, a full description of one only is required.

It comprises an upright support 265 (Figures 10 and 17) adjustably carried on a cross-rod 266 mounted on the main-frame.

Hinged on the top of the element 265 I provide an apertured block 267 (Figures 17 and 18) designed to be held at the required elevation by a thumb-screw 268 extended through a threaded hole in the block and bearing at its lower end on the top face of a bracket 269 outstanding from the support.

Part 267 has a transverse, cylindrical bearing 271 receiving an apertured reciprocatory shaft 272 carrying at and fitted in one of its ends a perforated stem 273 of a tail-stock disc 274 fitted with a rubber or other compressible or resilient washer or gasket 275 designed to engage directly with the adjacent end of the tubular glass blank and seal it air-tight.

Shaft 272 and the tail-stock which it carries are reciprocated by a round-ended arm 276 projecting into a slot 277 in the shaft and retained therein by a pin 278, such arm being loosely mounted on the top portion of a vertical shaft 279 oscillatory in bearings 281, 282 on the supporting element 265.

At its lower end, such shaft has an arm 283 fixed thereto and pivotally connected to a longitudinally disposed bar 284 (Figure 16) having a yielding spring connection with an arm 285 fixed to shaft 89.

Near its upper end, shaft 279 has two arms 286 and 287 (Figs. 17 and 18) at right-angles to one another, the former having an upward extension 288 in a slot of arm 276 through which means the latter is operated.

Arm 287 has an adjustable abutment screw 289 adapted to engage the adjacent face of member 265 to act as a stop or gauge, and the companion arm 286 has two such screws 291 and 292 designed to operate in the manner specified below.

A space bar or lever 293 is fulcrumed on the support 265 at 294 and is adapted to swing to bring its upper end between the screw 291 and the face of the adjoining bracket 269 or to bring it into inoperative position.

The two fulcrumed space-bars, one for each tail-stock, are rocked by means of their lower ends co-operating with a frame 295 (Figure 1) mounted to oscillate on shaft 174 and rocked by a cam 296 on the side of gear 63.

As is depicted in Figure 18, the stem of each rotatable tail-stock 274, 275 bears at its end on a single ball-bearing 297, its longitudinal bore 298 being deflected at its inner portion to escape such ball and maintain an unobstructed communication with the larger channel 299 in the sliding shaft 272, the other end of such channel being connected by a hose 301 to the globular enlargement 302 on one end of a bent glass tube 303, the other end of which has a similar hollow spherical part 304 open to the outer air through a relief-tube 305, the bent tube and its enlarged ends being partially filled with a suitable liquid 306 such as water.

As is illustrated in Figures 1, 2, 10 and 22 to 25 inclusive, this bent glass tube is fixedly mounted on a board or plate 307 rockingly supported on a shaft 308 carried by an appropriate bracket 309 mounted on the main frame.

The plate or board 307 is rocked on its supporting shaft 308 by means of an arm 311 secured to the shaft, and an upright link 312 adjustably connected thereto and at its lower end similarly connected to a long rock-arm 313 fulcrumed on the main-frame at 314 (Figure 10), such latter arm carrying a downward projection coacting with a cam 315 on the end of shaft 62, the descent of the member 313 being limited by an adjustable stop-screw 316.

On its other side, the plate 307 has secured to it a second, bent-glass tube 317 partially filled with liquid like the companion tube already described, and this second tube is connected by a flexible hose 318 with the other tail-stock 263 all as will be readily understood (see Figures 2, 10 and 22).

It will be perceived that by rocking the supporting plate and its glass tubes internal pressure of any desired or graduated degree may be created inside of the heated glass blanks undergoing treatment.

At this station suitable, automatically-controlled gas-burners 321 and 322 are provided for heating the central or middle section of the duplex blank previously lipped at both ends.

Oppositely or reversely canted, spaced, bevelled, rubber-disc rollers 323 and 324 are provided each being mounted on its own shaft 325 and 326 respectively, these structures being very similar to those previously described in connection with the lipping mechanisms.

As is clearly shown in Fig. 10, shaft 325 and its roller are revolved by means of bevel-gear 327 in mesh with bevel-gear 118 on shaft 112, telescopic shaft 328, and intermeshing gears 329 and 331, and, similarly, the complementary shaft 326 is rotated by means of gear 332 in mesh with gear 125 on shaft 65, telescopic shaft 333, and coacting gears 334 and 335.

The brackets 336 and 337, (Figure 10) carrying the shafts fitted with the blank-rotating rollers 323 and 324 are raised and lowered by a mechanism substantially like that shown in Figure 7 for a similar action on the rollers 107 and 241, the present structure comprising the following cooperating instrumentalities, cam 338 on shaft 62, roller 339, bent arm 341, link 349, lever 347 on shaft 346 having a part below a threaded adjustable rod 348 on bracket 336, link 351, arm 352, shaft 342, arm 343, rod 344 screw-threaded through lug 345 on bracket 337.

The construction is such that the roller 323 descends first to rotate the double blank and after its central section has been heated adequately the other roller 324 descends into contact with the blank, the action of the two-canted rollers by reason of their oblique dispositions pulling the blank apart at the center into two separate elements.

In order to support the relatively-short, finished rounded-bottom glass bodies 363 and 364 thus produced, at this part of the machine, I employ a pair of short, notched, supplementary, horizontal bars 361 and 362, so that each of such bodies, when not on the anti-friction rollers, is supported in seats or saddles of one of the long bars 34 or 35 and one of the complementary or companion short bars 361 or 362 as the case may be.

The discharge chute for the completed products is not shown, but it may be of any suitable or appropriate character.

The actuation of the machine is controlled or governed by means of a conveniently-located handle 365 (Figure 1) arranged to operate a clutch 366 between the cone drive-pulley 66 and the shaft 65 on which it is loosely mounted.

It is desirable that such a machine should stand firmly on the floor being supported by all of its carrying-wheels even though the floor surface is irregular in shape, and to this end I have provided the frame of the machine with a novel and simple stabilizing means.

This comprises four supporting wheels or rollers 371, 372, 373 and 374 on which the main-frame is mounted, the trunnions of such wheels being mounted for vertical play in the slots 375 of the frame which accommodate them, retaining-plates 376 being used below the slots to prevent dislodgement of such wheels.

Adjacent to each wheel, a bell-crank lever 377 is fulcrumed on the main-frame at 378, the ends of such levers under certain conditions being adapted to engage or rest on the peripheries of their respective wheels or rollers.

Near one end of the frame, a cross-shaft 379 is provided fitting in bearings in the ends of two of the bell-crank levers on opposite sides of the frame.

Each end of such shaft has an outstanding eccentric pin 381 and these two pins are associated with two connecting-rods 382 each secured concentrically with its own short shaft 383 mounted in a bearing 384 in the end of the bell-crank lever on the same side but at the opposite end of the frame.

Such stabilizing structure is operated by turning shaft 379 which through the eccentric pins and connecting links presses the bell-crank levers 377 at the right-hand end of the machine as viewed in Figures 26 to 29 against the top faces of their respective supporting wheels.

As soon as such contact is made, further turning of the shaft causes the rocking of the bell crank levers at the other end of the machine bringing them into engagement with their wheels, whereby the frame is then directly supported by the several wheels through these levers and slightly different positions of such wheels by reason of inequalities in the floor surface are compensated for.

All strain is thus taken off of the frame sively greater intensity to round out such heated part.

2. In a machine of the character described, the combination of means to form a heated closed end on a hollow glass body, and mechanical means to subject the interior of said body to a plurality of fluid pressures of progressively greater intensity to round out such heated end.

3. In a machine of the character described, the combination of means to heat a part only of a hollow glass body, and mechanical means to subject the interior of said body to a plurality of fluid pressures of progressively greater intensity to round out such heated part, the external shape of the completed rounded part being formed solely by the action of said internal pressures.

4. In a machine of the character described, the combination of means to heat an intermediate portion of a hollow duplex glass blank, means to draw apart the two sections of the blank on opposite sides of said heated portion dividing the blank into two hollow bodies with closed ends, and means to subject the interiors of said bodies each to a plurality of fluid pressures of progressively greater intensity to round out their heated ends.

5. In a machine of the character described, the combination of means to heat an intermediate portion of a hollow duplex glass blank, means to draw apart the two sections of the blank on opposite sides of said heated portion dividing the blank into two hollow bodies with closed ends, means to reheat said closed ends, and means to subject the interiors of said bodies each to a plurality of fluid pressures of progressively greater intensity to round out their reheated ends.

6. In a machine of the character described, the combination of means to form a heated closed end on a hollow glass blank, and means to create a fluid pressure in said blank to round out such heated end, comprising a rockingly-mounted tubular member, means to rock said member, a fluid in said member, and means connecting one end of said member to the interior of said blank, the other end of said member being open to the atmosphere.

7. In a machine of the character described, the combination of means to heat an intermediate portion of a tubular glass blank, means to separate said blank into two bodies with heated closed ends, and means to create an internal fluid pressure in each of said bodies to round out their heated ends, comprising a pair of rockingly-mounted bent fluid-containing tubular members, means to rock said members, and means connecting ends of said members to the two bodies, the other ends of the members being open to the atmosphere.

8. In an appliance of the character described, the combination of an abutment, means to support a tubular glass blank with an end against said abutment, means to rotate the blank while in this position, means to heat the opposite end of the blank, means to form a circular flaring lip around said heated end of the blank, a second abutment, means to support the blank with its lipped end against said second abutment, means to transport the blank from the first to the second abutment, means to heat the unlipped end of the blank, means to rotate the blank with its end bearing on said second abutment, means to form a like circular flaring lip on the second end of the blank while the latter is cooperating with said second abutment, means to divide the blank intermediate its ends into two lipped bodies with closed ends, means to close the lipped ends of said bodies, means to heat the glass ends of said bodies, and means to create internal fluid pressure in both bodies to round out their ends.

9. In an appliance of the character described, the combination of means to form a flaring lip around one end of a tubular glass blank, means to close the lipped end of the blank, means to heat the other end of the blank and form a closed bottom thereat, and means to create an internal fluid pressure in said blank to provide a rounded closed bottom for the article.

10. In an appliance of the character described, the combination of means to provide circular flaring lips on the opposite ends of a tubular glass blank, means to divide the blank at an intermediate point of its length into two bodies with closed ends, means to heat said ends, means to close both lipped ends of said body, and means to create internal fluid pressures in said bodies to round out said closed ends.

11. In an appliance of the character described, the combination of means to provide circular flaring lips around the opposite ends of a duplex tubular glass blank, means to heat an intermediate portion of the blank, means to draw apart the sections of the blank on opposite sides of the heated portion thereby dividing the blank into two lipped bodies with closed bottoms, means to reheat said bottoms, means to close the lipped ends of said bodies, and means to produce graduated fluid pressures in said bodies to round out said reheated bottoms.

HANS N. HALVERSEN.

because each wheel will support its part of the weight through its co-acting bell-crank lever.

It is to be noted that, as shown in Figure 28, the eccentric pin 381 is slightly above the center of shaft 379, thus constituting a lock for the appliance.

The operation of the machine occurs practically as follows:

The duplex or double-length tubular glass blanks are removed one by one from the supply-magazine and caused to traverse the machine in an intermittent or step-by-step movement.

When each one reaches the first station, its end becomes heated, it is rotated during such heating action by the upper bevelled rubber-disc, and its unheated end is held against the tail-stock.

When adequately heated, and the gas supply has been reduced, the lipping tool performs its rim forming operation.

Thereupon the rubber roller rises, the tail-stock recedes slightly and the blank passes on to be replaced by another.

When the tube, now lipped at one end, reaches the second lipping station, the other end of it is lipped in similar manner.

At the third station the rubber-disc 323 first descends and rotates the blank while its end is held by such disc against the tail-stock 263 and during this period the middle section of the blank is heated by flames from the burners 321 and 322.

When such portion of the tube has become sufficiently plastic under the heat treatment to which it is subjected, then the second disc 324 descends and the two discs pulling the two halves of the tube in opposite directions it becomes parted in the middle, forming closed ends at the division point.

Then these closed ends are brought into the field of action of the glass-flames for further heating by the inward travel of both tail-stocks, such further movement in that direction being accomplished by so moving the space bars that they are then under the ends of screws 291 instead of screws 292.

This additional inward travel of the tail-stocks is necessary by reason of the absorption of a certain amount of the glass in the blank in the formation of the closed bottoms.

When heated adequately, the gas-flames are greatly reduced, almost extinguished, and then the two-bent-tube, air-pressure-producing tubes 303 and 317 are rocked slightly, as shown in Figure 23, to produce in both bodies a slight internal air pressure to effect the initial bulging or rounding out of the bottoms, then the bent pressure-producing tubes are rocked still further as shown in Figure 24 to produce a somewhat greater internal air pressure in the bodies thus completing the rounding out of the bottoms.

It will be seen, therefore, that the full pressure is produced in a plurality of steps to secure a uniform thickness of the glass in such bottoms.

If the full pressure were introduced at once an unequal thickness or breaking of the bottoms might occur.

The bodies having been thus completed, the tail-stocks recede breaking the connections therewith, thus equalizing the pressures on the two sides or ends of the water columns as depicted in Figure 25.

The blank rotating rubber-discs having been previously elevated, the finished bodies with rounded bottoms are carried away from this station and delivered into any suitable receptacle not shown.

The air and water tubes by means of which the desired pressures are created are separately connected to the two tail-stocks so that if for any reason one end of the tubular blank is imperfect and fails to make an air-tight connection with the rubber-disc of its tail-stock, nevertheless a perfect product may be made from the other half of the blank.

It will be observed that the blank-rotating rubber-discs at the two lipping stations and the corresponding discs at the bottoming station are operated by separate cams partially because the tubular blank has to be heated longer for bottoming than for lipping.

Consequently, the disc rollers at the lipping stations ascend in advance of those at the bottoming station, thus avoiding unnecessary wear on their tail-stocks.

From the above description of the appliance and from its illustration in the drawings, it will be clear that its several members and parts are susceptible of adjustments permitting the manufacture of glass bodies of different dimensions.

It will be seen also that since the lipping tools rock downwardly during the performance of their functions, while the tubular glass blanks are properly supported, such tools require little, if any, substantial adjustment to work on blanks of substantially different diameters.

Many minor mechanical changes may be incorporated in the machine presented in detail herein without departure from the substance and essence of the invention, and without the sacrifice of any of its material benefits and advantages.

I claim:—

1. In a machine of the character described, the combination of means to heat a part only of a hollow glass body, and mechanical means to subject the interior of said body to a plurality of fluid pressures of progres-